Aug. 12, 1941.　　I. W. SIMPKINS ET AL　　2,252,529
VEHICULAR SIGNAL
Filed Sept. 6, 1940　　2 Sheets-Sheet 1

Inventors:
Isaac W. Simpkins
and Eugene R. Nelson
By Eaton & Brown
Attorneys

Aug. 12, 1941.  I. W. SIMPKINS ET AL  2,252,529
VEHICULAR SIGNAL
Filed Sept. 6, 1940   2 Sheets-Sheet 2
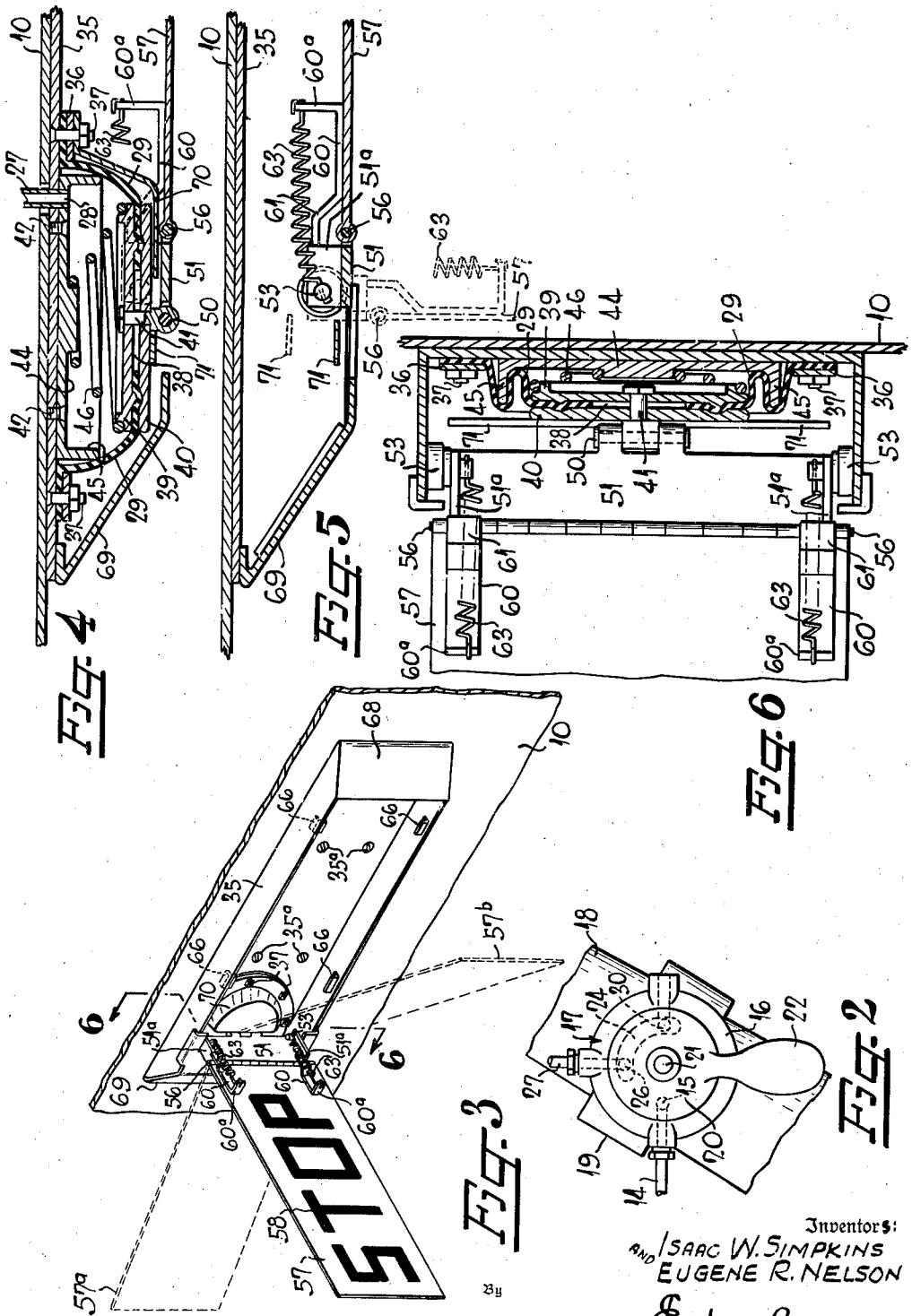
Inventors:
Isaac W. Simpkins
and Eugene R. Nelson
By Eaton & Brown
Attorneys Patented Aug. 12, 1941

2,252,529

UNITED STATES PATENT OFFICE 2,252,529

VEHICULAR SIGNAL

Isaac W. Simpkins and Eugene R. Nelson, Charlotte, N. C., assignors to Power Brake Company, Charlotte, N. C., a corporation of North Carolina Application September 6, 1940, Serial No. 355,640

3 Claims. (Cl. 116—39)

This invention relates to a signal apparatus which is adapted to be used in combination with vehicles such as automobiles, trucks and the like to indicate to approaching drivers the course of action intended to be taken by the driver of the vehicle. More specifically the invention relates to a pneumatically controlled stop sign which is capable of being extended to operative position at substantially right angles to the vehicle where it is visible to approaching drivers and which is also capable of being collapsed to an inoperative position in parallel relation to the sidewall of the vehicle upon which it is mounted. The present invention is particularly adapted for use as a stop signal on school buses. In many states, laws have been enacted which require approaching or overtaking traffic to come to a stop when school children are entering or leaving buses. Therefore, it is necessary that a proper sign accompany each bus so that traffic can ascertain when the bus is about to stop or is not in motion.

It is an object of this invention to provide a pneumatically operated sign board pivoted alongside a vehicle as above described, said board being yieldingly held in extended position so that it will give way to obstructions such as garage doors, posts and the like while the truck is moving in either direction. This is a very important factor, especially when the driver neglects to retract the stop sign after starting the vehicle in motion. With the stop sign extended a substantial distance at right angles to the path of travel of the bus, many obstructions may be encountered which otherwise would not present an obstacle.

It is a further object of this invention to provide a pivoted sign board of the class described which is normally retracted wholly within a streamlined casing, which is secured to the side of the vehicle. When in this retracted position, one face of the board is exposed to view, but the edges fit snugly in the casing, thereby making it difficult for unauthorized persons to extend the sign. Also the casing is tapered at both ends so that when an obstruction is engaged, a repelling action will take place to prevent the casing from being torn from the vehicle.

Some of the objects of the invention having been stated, other objects will appear as the description proceeds, when taken in connection with the accompanying drawings, in which—

Figure 2 is a detail view showing the control valve for operating the signal, said control valve being mounted upon the steering column of the truck;

Figure 3 is an isometric view of the apparatus showing the signal board extended to operative position which is substantially at right angles to the line of travel of the vehicle;

Figure 4 is a sectional plan view taken along the line 4—4 in Figure 1;

Figure 5 is a sectional plan view taken along the line 5—5 in Figure 1 with the moving parts shown in dotted line extended position;

Figure 6 is a vertical sectional view taken along the line 6—6 in Figure 3.

Figure 1:
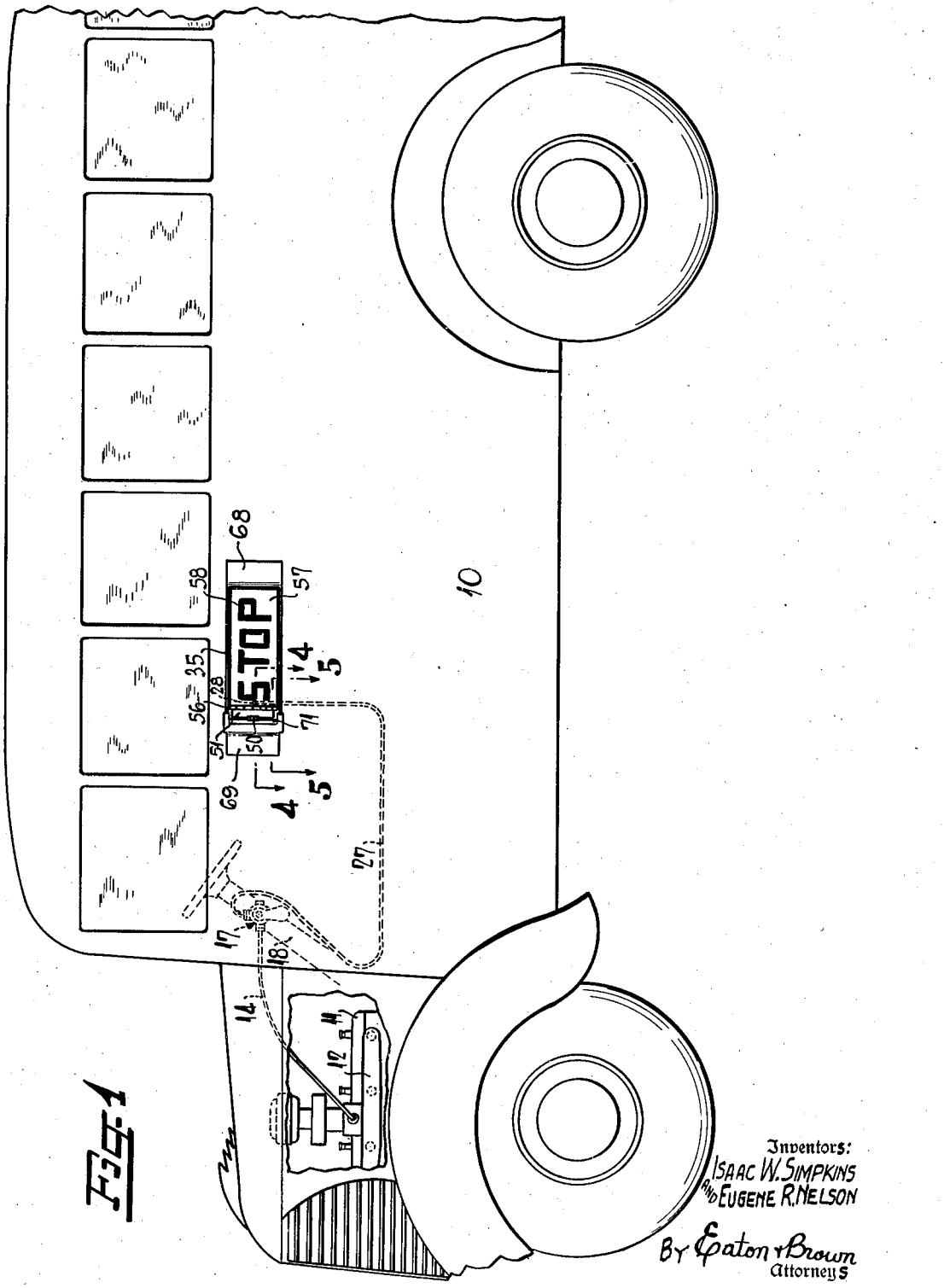
Figure 1 is a side elevation of an automotive vehicle showing the improved signal apparatus installed thereon.

Referring more particularly to the drawings, the numeral 10 denotes a suitable bus or truck having an engine 11, said engine having an intake manifold 12. Leading from the manifold 12 is a suitable suction line 14, the other end of which leads to an outlet port 15 in a base member 16 of a valve 17 (Figures 1 and 2). The valve 17 is secured to steering column 18 of the vehicle by means of a band 19.

The base member 16 has one face of a flat plate 20 rotatably mounted thereagainst as at 21, said plate having a handle 22 which is used by the operator for rotating the plate when it is desired to actuate the valve mechanism. The plate 20 has a concave arcuate trench 24 cut in the face thereof which is normally closed by the face of the base member 16. This arcuate trench has its center at point 21 and subtends an angle of slightly over 90 degrees in the present embodiment. Therefore, since the outlet port, the inlet port and the exhaust port are disposed in plate 16 at 90 degrees apart, and located on the same radius as the trench, the trench furnishes communication between two of these ports, depending upon the position to which the handle 22 is turned.

The base plate 16 also has an outlet port 26 therein, which port has a pipe 27 leading therefrom, said pipe having its other end communicating with a port 28 (see Figure 4) which leads to the interior of rubber diaphragm 29. Also leading from the base plate 16 is a third port 30 which serves to admit air to the pipe line 27 and to the interior of diaphragm 29 at the desired time, so that the diaphragm can be expanded.

By referring to Figure 2 it is seen that the arcuate trench 24 furnishes communication between the ports 26 and 30 in the position shown. This will permit the atmospheric pressure to enter by way of pipe 27, port 26, trench 24 and exhaust port 30. When it is desired to create a partial vacuum or suction within the diaphragm 29, the plate member 20 is rotated in a counterclockwise manner in Figure 2, until the arcuate trench 24 furnishes communication between ports 15 and 26. At this time, the suction which is present in the intake manifold 12 while the engine 11 is running, will draw the air from the interior of this diaphragm and into the manifold by way of port 28, pipe 27, port 26, trench 24 and pipe 14.

The rubber diaphragm 29 is cup shaped and has its rim secured to the interior of a casing 35, by any suitable means such as ring or washer 36, and bolts 37 (Figures 5 and 6). This diaphragm member has a hole 38 therein, said hole being normally closed by plates 39 and 40, which plates are clamped together on opposed sides of the hole for engaging the edges thereof by any suitable means such as a bolt 41.

Secured to the casing 35 by any suitable means such as screws 42, and being disposed within the diaphragm 29, is a circular disk-like member 44. This disk-like member has an annular flange 45 integral therewith, extending laterally into the diaphragm member 29. The purpose of flange 45 is to support the sidewalls of the diaphragm and prevent the same from collapsing inwardly when suction is applied to the interior thereof. The flange thus prevents injury to the diaphragm. The central portion of the disk-like member 44 acts as an abutting member for a coil spring 46, which coil spring has its other end abutting plate member 39, also within the rubber diaphragm. The purpose of this spring is to normally force the diaphragm member 29 to an expanded position as shown in Figure 4.

The housing 35 is secured to the body of the bus 10 in the manner shown in Figures 1 and 3, by any suitable means such as screws or bolts 35a.

The bolt 41, which penetrates the plates 39 and 40 has pivoted to the outer end thereof as at 50, a plate member 51 which is also pivoted as at 53 to the upper and lower sidewalls of the casing 35. Pivoted to the plate 51 as at 56, is a board or plate-like member 57 which has indicia 58 painted on both sides thereof. Suitable brackets 60 are secured to one side of the plate 57 (see Figures 5 and 6) which brackets have projections 61 disposed in spaced relationship to the board 57, and the ends of these projections 61 contact outstanding flanges 51a of plate 51. A spring 63 has one end thereof secured to the outstanding leg 60a of each bracket member 60 and has its other end secured to the pivot point 53. These springs normally hold the projections 61 in engagement with the outstanding flanges 51a. In other words, the springs 63 yieldingly hold the board member 57 in an extended aligned position with the plate 51 at all times. For example, if the vehicle is moving backwardly when the sign is in an extended position and the free end of the board 57 contacts a stationary object, then the free end of the board will be rotated by contact with the object about pivot point 56 into dotted line position 57a in Figure 3. Of course, the position to which the board is rotated will be dependent upon how close the stationary object is located to the rearwardly moving truck. In any event when the object has been passed the spring 63 will return the board 57 to the bold line position in Figure 3. On the other hand if the board 57 encounters a stationary object while the truck is going forwardly, then the board 57 and plate 51 will be rotated to dotted line position 57b in Figure 3. This pivoted action will take place about pivots 53 instead of about pivot 56. In order to rotate members 51 and 57 about the pivot points 53 toward the rear end of the truck, it will be necessary for the diaphragm 29 to be expanded. The force necessary to expand this diaphragm against the suction of the intake manifold, however, is not great, so no breakage of parts will occur. Likewise after the stationary object has been passed by the sign board 57, the parts will return to bold line position as shown in Figure 3 due to the suction within the diaphragm 29. It is thus seen that the members 51 and 57 are yieldingly held in an extended position and will not be seriously damaged when stationary objects are encountered while the truck is moving. It should be understood however that the sign is not supposed to be in extended position while the truck is in motion, but occasionally the driver inadvertently fails to operate the valve 17 to cause the sign to be retracted.

The housing 35 has suitable stops 66 therein which serve to restrict the inward movement of the board 57 when the same is in a retracted position. These stops are so located that the sign boards 51 and 57 will be disposed wholly within the casing 35, yet the side edges of these boards fit snugly in the opening so that it is difficult for anyone to tamper with the sign and extend it to operating position without employing the suction means. The spring 56 within the diaphragm normally holds the plate or board 51 and 57 in a position parallel to the line of travel of the vehicle when a suction or a partial vacuum is not present within the diaphragm 29.

Especial attention is called to the shape of the housing 35. It is noted that the housing has tapered ends 68 and 69, so that should the vehicle be driven close to some stationary object, there would be a tendency to cause the vehicle body to be wedged away from the stationary object and allow the vehicle to pass thereby without damage to the housing or signal mechanism. Should the ends be square, it is evident that the contact would be more direct and hence the likelihood of damage or the entire removal of the casing 35 from the side of the truck would be increased.

The interior of the casing 35 has a guard member 70 secured therein by means of bolts 37 previously described. This guard member protects the top side of the diaphragm 29 and makes it inaccessible to anyone who would damage or puncture the same. An additional guard plate 71 is secured to plate 40, on the opposite side of the bolt 41 from the guard 70, which plate serves to close the opening between the plate 51 and the tapered end plate 69. This guard plate 71 protects the diaphragm 29 in the same manner as guard member 70.

If it is desired to hold the signboard 57 in extended position while the motor is not running, it would first be necessary to cause the sign to be extended due to the suction of the intake manifold while the motor is running as previously described. With the suction on the diaphragm 29, the sign will be extended and at this time the ports 26 and 15 will communicate with each other by means of arcuate trench 24. The member 20 can then be rotated to a position where the slot 24 will communicate only with the port 26, thereby cutting off the suction from the intake manifold by way of pipe 14, but at the same time maintaining the partial vacuum within the collapsed diaphragm 29, thus holding the sign in outstanding position. With the member 20 in the position just described, the motor can then be cut off without affecting the position of the sign board 57.

In the drawings and specification, there has been set forth a preferred embodiment of the invention, and although specific terms are employed, they are used in a generic and descriptive sense only and not for purposes of limitation, the scope of the invention being set forth in the appended claims.

We claim:

1. A vehicular signal comprising a casing secured on the side of the vehicle, a flexible diaphragm secured in the casing, a plate member having one end pivotally secured to the free side of the diaphragm, said plate also being pivoted intermediate its ends to the casing in an off-center relation to the diaphragm shaft, a signal board pivoted to the other end of said plate, a compression spring within the diaphragm for yieldingly holding the free side of the diaphragm outwardly from the vehicle to thereby hold the signal board substantially parallel to the side of the vehicle, means for applying suction to the said diaphragm to thereby cause said plate and board to rotate about said casing pivot to an extending position substantially at right angles to the side of the vehicle, a stop on the signal board, a stop on the plate, a tension spring secured to the pivot point of the plate and to the signal board to move with the plate member when it is pivoted by the diaphragm moving inwardly, said spring means normally maintaining the two stops in abutment and thereby holding the board in alinement with the plate member.

2. A vehicular signal comprising a casing secured to the side of the vehicle, a flexible diaphragm secured in the casing, a plate member pivotally secured to the free side of said diaphragm, said plate also being pivoted intermediate its ends to the casing in an off-center relation to the diaphragm pivot, a signal board pivoted to the said plate, means for yieldingly holding the free side of the diaphragm outwardly from the vehicle to thereby hold the plate substantially parallel to the side of the vehicle, cooperating alined stops on the plate and signal board, spring means for holding said stops in abutting relation and thereby causing the signal board to move with the plate member when it is pivoted by the diaphragm moving inwardly, said spring means normally maintaining the board in alinement with the plate member, means for applying suction to said diaphragm to thereby cause said plate and board to rotate about said casing pivot to an extended position substantially at right angles to the side of the vehicle and means for supporting the base portion of the interior wall of the diaphragm to prevent inward collapse of the base portion of the diaphragm when the suction is applied.

3. A vehicular signal comprising a casing adapted to be secured on the side of the vehicle, a flexible diaphragm secured in the casing, said diaphragm having a shaft extending from its free side, a plate member having one end secured to the diaphragm shaft, a signal board pivotally secured at one of its ends to the free end of said plate, said plate being also pivoted intermediate its ends to the casing in an off-center relation to the diaphragm shaft, cooperating, alined stops on the plate and signal board, spring means for holding said stops in abutting relation and thereby causing the signal board to move with the plate member when it is pivoted by the diaphragm moving inwardly, said spring means normally maintaining the board in alinement with the plate member, means for applying suction to said diaphragm to cause said plate and signal board to rotate about said casing pivot to an extended position substantially at right angles to the side of the vehicle, an annular member for supporting the base portion of the interior wall of the diaphragm to prevent inward collapse of the base portion of the diaphragm when suction is applied.

ISAAC W. SIMPKINS.
EUGENE R. NELSON.